Dec. 29, 1959 P. HOLLINGSWORTH 2,919,137
COUPLINGS
Filed Dec. 27, 1957 2 Sheets-Sheet 1

INVENTOR.
PIERCE HOLLINGSWORTH.
BY
his ATTORNEY.

Dec. 29, 1959  P. HOLLINGSWORTH  2,919,137
COUPLINGS
Filed Dec. 27, 1957  2 Sheets-Sheet 2

INVENTOR.
PIERCE HOLLINGSWORTH.
BY
Olin E. Williams.
his ATTORNEY.

United States Patent Office 2,919,137
Patented Dec. 29, 1959

2,919,137

COUPLINGS

Pierce Hollingsworth, Baltimore, Md., assignor to Koppers Company, Inc., a corporation of Delaware Application December 27, 1957, Serial No. 705,606

11 Claims. (Cl. 279—87)

This invention relates to apparatus for quickly connecting and disconnecting driving and driven members.

There has long been a need for a reliable and inexpensive means for quickly disconnecting and connecting the driven and driving members which would eliminate down time in many industries where a driven member is connected to a driving member. The steel industry, especially in rolling mill operations where driven rolls are changed continuously from one size to another, where heavy duty couplings are essential because of the nature of the magnitude of torques involved and where angular shaft misalignment between the driving means and the driven frequently occur because of the variation in geometry of the material being rolled has had such a need; and since their rolling mills are presently handling more and more bar stock of different sizes and since their operations demand an ever increasing amount of efficiency, the need for such a quick-disconnecting and connecting means is now universally recognized.

Heretofore, flexible heavy duty gear type couplings used in rolling mills between the driven rolls and the driving means have successfully met the need for angular misalignment between the driving means and the driven rolls. But such couplings were either attached to the driven rolls by a series of complicated, close tolerance locking pins, and the operation of removing these couplings from the rolls was a long tedious task and more often than not the couplings were arranged so that the coupling could not be reconnected to another roll with the precision of the original connection. Moreover, the coupling units were heretofore loosely attached to the rolls to permit free sliding of the roll necks in and out of the coupling units, and the loosely fitted coupling resulted in metal fatigue and excessive wear of parts necessitating frequent replacement of expensive rolls and equipment. Another coupling device that has been used is the type wherein the sleeve is connected to the driven roll and the hub which connects with the sleeve to form the coupling and which is connected to the driven member. In this coupling, the sleeve remains with the driven roll and hub remains with the driving member, and to decouple the sleeve and hub removing the sleeve of the coupling from the coupling hub while the coupling sleeve remains firmly attached to the roll. This, however, required additional expense for each roll had to have its own coupling sleeve.

An object of this invention is to eliminate these problems and to provide a reliable heavy duty, less expensive, firm fitting, quick disconnect coupling means which allows for angular shaft misalignment between the driven means and the driving means.

Another object of the present invention, is to provide a means for quickly connecting and disconnecting a driving member from a driven member.

A further object of the present invention is to provide a means which quickly connects and disconnects a driving member from a driven member and which provides a firm, close tolerance grasp between the driven member and the driving member when in use.

A further object of the present invention is to provide a means which quickly connects and disconnects driven members from driving members and which permits easy and inexpensive removal, replacement, and interchangeability of driven members.

A further object of the present invention is to provide a means for quickly connecting and disconnecting a driven member and a driving member wherein the driving member includes an integral sleeve attached thereto such that when the driven member is disconnected the sleeve remains with the driving member, and wherein the driven member may be rigidly connected.

The above and further objects and novel features of the invention will appear more fully from the following detailed description when the same is read in connection with the accompanying drawing. It is to be expressly understood, however, that the drawing is not intended as a definition of the invention but is for the purpose of illustration only.

In the drawing wherein like parts are numbered alike:

Figure 1:
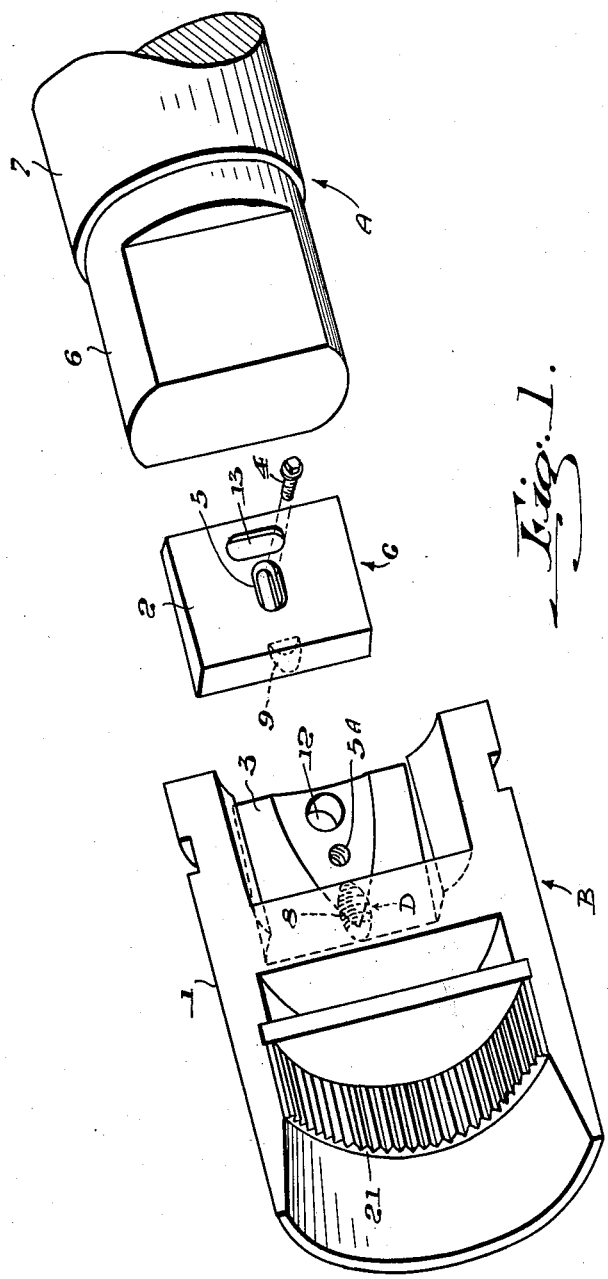
Fig. 1 is an isometric view of the coupling.

Referring now to Fig. 1, the novel coupling for driven member A and driving member B includes a pair of tapered keys C within one end of a coupling sleeve of member B and a locking means D for the keys.

Driving member B includes a cylindrical coupling sleeve 1 with two internally located tapered keyways 3 located on antipodal, i.e., opposite sides of the sleeve, each of which is adapted to hold a tapered key 2 firmly in place. The key 2 is attached to the internally located keyway 3 by a conventional cap screw 4 which passes through an elongated opening 5 in the center of the key 2 and threads into a tapped opening 5A in the sleeve. This elongated opening permits limited longitudinal movement of key 2. The cross-sectional area of the sleeve opening by longitudinal movement of the key 2 is increased or decreased, i.e., the key in its most inward position provides the greatest cross-sectional area while the key in its most outward position provides the smallest cross-sectional area.

The driven member A includes adjacent to a roll 7 a neck 6 which is fashioned by milling parallel flat portions on opposite sides so as to be of the same geometrical cross-section as the opening between the key 2 of the sleeve 1 but has a cross-sectional dimension intermediate the largest and smallest open cross-sectional areas that can be obtained by sliding the keys 2 in the keyways 3 of the sleeve 1; the keyways being on antipodal, i.e. opposite, sides of the driven member.

Figure 2:
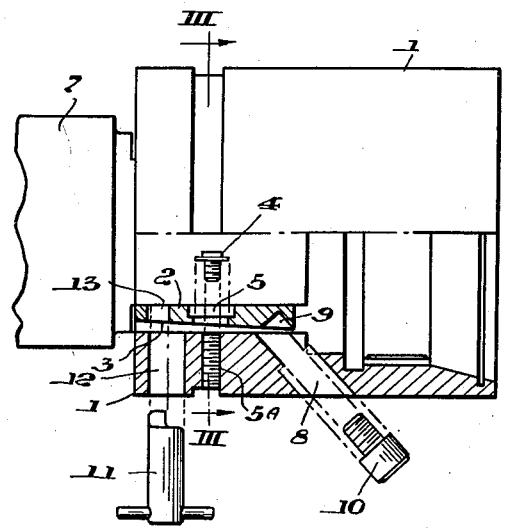
Fig. 2 is a partial cross-section of the coupling shown in Fig. 1 in operating position.
Figure 3:
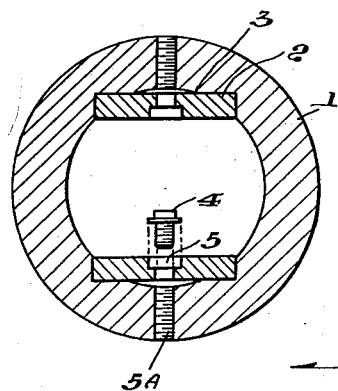
Fig. 3 is cross-sectional view taken through line III—III of the coupling sleeve of Fig. 2.

The locking means D for the connecting means between the driven and driving members A and B respectively firmly lock keys 2 following the introduction and placement of the neck 6 of the roll 7 within this sleeve 1. To this end there is provided in sleeve 1 an angled threaded aperture 8, directed toward the center line and roll end of the sleeve 1 in a plane perpendicular to the plane surface of the tapered key 2, Fig. 2, and there is provided on the peripheral surface of the key 2 a notch 9 which is located opposing the base of the angled sleeve hole 8. A conventional capscrew 10 threads through the aperture 8 and engages the notch 9. Tightening of capscrew 10 forces the key 2 to a more outward position in the sleeve 1, thus reducing the cross-sectional area of the opening of the sleeve and producing a tight wrench-like grip on the neck 6 of the roll 7.

A removable cam pin key 11 is provided for the rapid disconnection of the coupling. To disconnect the coupling, the two opposite capscrews 10 are threaded out from notch 9, and the cam pin key 11 is inserted into a large hole 12 in the sleeve 1 and engaged in a slot 13 in the tapered key 2. Rotation of this cam pin 11 forces the tapered key 2 in an inward direction increasing the cross-sectional area of the opening of the sleeve 1 and permitting easy removal of the roll neck 6. Cam pin key 11 is removable from the large hole 12 in sleeve 1 and is inserted only when it is desired to disconnect the coupling described herein. There is an eccentric portion on the end of the cam pin key 11 which forces the key 2 out of engagement with the sleeve 1 when it is rotated.

Sleeve 1 of driving member B also has internally cut teeth 21 adapted to be connected to a conventional flexible gear type coupling to take up angular shaft misalignment between the coupling and sleeve 1. In such a case a member of the coupling has externally cut teeth not shown which mesh with the internally cut teeth 21 of the sleeve 1 so that errors in alignment between the coupling member and the sleeve 1 are taken up through the meshing teeth.

It is to be understood that the same arrangement as described above may be duplicated at the other end of roll 7 with the effect of a spindle coupling which not only takes up parallel shaft offset but also angular shaft misalignment. The novel arrangement of this invention thus provides a means for rapidly connecting and disconnecting a driven member and a driving member.

Although the foregoing has illustrated and described the invention in detail, it is to be expressly understood that the invention is not limited thereto. Various changes can be made in the design and arrangement of the parts without departing from the spirit and the scope of the invention as will now be understood by those skilled in the art.

What is claimed is:

1. In a coupling for a driven member and a driving member adapted to rotate for the transmission of torque, cooperating oppositely located tapered elements, a receiving means attached to said driven member, a receiving means attached to said driving member, said tapered elements adapted to slideably engaging both of said receiving means so as to rigidly connect said driven and driving members, first means threaded in said driving member at an angle to the axis thereof to force said elements into rigid engagement with each of said receiving means, and a turnable member engageable with said driving member and said elements for forcing said elements out of rigid engagement with said receiving means.

2. In a coupling for a driven member and a driving member adapted to rotate for the transmission of torque, a plurality of cooperating oppositely located tapered keys, a driven member having a plurality of first key engaging portions, a driving member also having a plurality of second key engaging portions, said tapered keys being slideably engageable with one of said first portions and one of said second portions so as to rigidly connect said driving and driven members, movable means threaded in said driving member at an angle to the axis thereof to force each of said keys into rigid engagement with one of said first and second portions respectively, and a turnable member engageable with said driving member and said keys and for forcing said keys out of rigid engagement with said driven member and said driving member.

3. In a coupling for a driven member and a driving member adapted to rotate for the transmission of torque, two cooperating oppositely located tapered keys, a driven member having two first antipodal externally located key engaging portions, a driving member having two second internally located antipodal key engaging portions, each of said tapered keys being slideably engageable with one of said first and second portions so as to rigidly connect said driving and driven member, moveable means threaded in said driving member at an angle to the axis thereof to force each of said keys into rigid engagement with one of said first and second portions respectively and a turnable member engageable with said driving member and each of said keys for forcing said keys out of rigid engagement with said driven member and said driving member.

4. In a coupling for a driven member and a driving member adapted to rotate for the transmission of torque, two tapered keys, a driven member having two first externally located antipodal key engageable portions, a driving member having two second internally located antipodal key engageable portions, each of said keys being longitudinal in cross section having one side tapered and being slideably engageable with one of said first and second portions so as to rigidly connect said driven and driving members, said keys also being moveable relative to said driving member so that their most inward position provides the greatest cross-sectional area while in their most outward position provides the smallest cross-sectional area, means adjacent to said driving member for slideably holding each of said keys, moveable means in threaded engagement with said driving means at an angle to the axis of said driving means and engageable with the inward end of each of said keys respectively to force each of said keys into engagement with one of said first and second portions respectively, and a turnable member engageable with said driving member and both of said keys for simultaneously forcing said keys out of rigid engagement with said driven and driving members so that said driven and driving members may be quickly disconnected.

5. In a coupling for a driven member and a driving member adapted to rotate for the transmission of torque, two tapered keys, a driven member comprising a shaft having two first externally located antipodal key engageable portions at each end thereof, a driving member adjacent to either end of said driven member comprising a sleeve with two second internally located antipodal key engageable portions at one end and internally located teeth at the other end adapted to be driven, said keys being attached to said driving member such that each of said keys is in slideable engagement with one of said first and second portions thereby to rigidly connect said driven member with said driving member, movable means threaded in said driving member at an angle to the axis thereof to force each of said keys attached thereto into rigid engagement with one of said first and second portions respectively, and a turnable member engageable with said driving member and each of said keys attached thereto for forcing both of said keys out of rigid engagement with said driven member and said driving member.

6. In a coupling for first and second driven members adapted to rotate for the transmission of torque, a tapered key, a key engageable portion in said first means, a key engageable portion in said second means, said tapered key being slideably engageable with both of said portions so as to rigidly connect said first and second means, a movable means threaded in said second means at an angle to the axis thereof and engaging said key to force said key into rigid engagement with both of said portions so that said first and second members may be quickly connected, and a turnable member engageable with said second driven means and said key for forcing said key out of rigid engagement with said first and second means so that said first and second means may be quickly disconnected.

7. In a coupling for a driving member and a driven member adapted to rotate for the transmission of torque, a plurality of keys, a plurality of first key engageable portions in said driven means, a plurality of second key engageable portions in said driven means, said keys being slideably engageable with one of said first and second portions so as to rigidly connect said first and second portions, means threaded into said driving means at an angle to the axis thereof for forcing said keys into wedging engagement with said driving and driven members and a turnable member engageable with said driven means and said keys for forcing said keys out of engagement with said driven means so that said driven means may be quickly disconnected from said driving means.

8. In a coupling for first and second members adapted to rotate for the transmission of torque, a pair of tapered keys, two first antipodal internally located key engageable portions in said first means, two second externally located key engageable portions in said second means, each of said tapered keys being slideably engageable with one of said first and second portions so as to rigidly connect said first and second means, movable means threaded in said first means at an angle to the axis thereof and engageable with each of said keys for forcing each of said keys into rigid engagement with one of said first and second portions respectively so that said first and second means may be quickly connected, and a turnable member engageable with said first means and each of said keys for forcing said keys out of engagement with said first and second means so that said first and second means may be quickly disconnected.

9. In a coupling for first and second members adapted to rotate for the transmission of torque, two first internally located antipodal key engageable portions in said first means, two second externally located antipodal key engageable portions in said second means, two tapered keys slideably engageable with one of said first and second portions respectively so as to rigidly connect said first and second means, a means adjacent to said first means for slideably holding said keys, movable means in threaded engagement with said first means at an angle to the axis of said first means for forcing each of said keys into rigid engagement with said first and second means so that said first and second means may be quickly connected, and a turnable member engageable with said first means and each of said keys for forcing said keys out of engagement with said first and second means so that said first and second means may be quickly disconnected.

10. Apparatus for connecting a gear-type coupling sleeve with a shaft adapted to rotate for the transmission of torque to said shaft comprising a shaft having two first antipodal keyways, a gear-type coupling sleeve having internal gear teeth at one end and two antipodal keyways at the other end, two oppositely located cooperating tapered keys adapted to be interposed between said first and second keyways and adapted to be wedged therebetween, means holding said keys opposite each other and adjacent said second keyways so that said keys are movable axially of said sleeve, means threaded into one end of said sleeve at an angle to the axis of said sleeve for moving said keys in one direction so that said sleeve and shaft are rigidly connected by wedging action of said keys, and means in the other end of said sleeve adapted to receive a turnable member for moving said keys in the opposite direction so that said sleeve is released from said shaft by the removal of said wedging action of said keys.

11. Apparatus for connecting a rotatable gear-type coupling sleeve with a shaft for the transmission of torque to said shaft comprising a shaft having two first antipodal keyways, a gear-type coupling sleeve having internal gear teeth at one end and two antipodal keyways at the other end, two oppositely located cooperating tapered keys adapted to be interposed between said first and second keyways and adapted to be wedged therebetween, means in said coupling sleeve for holding said keys opposite each other and adjacent said second keyways so that said keys are moveable axially of said coupling sleeve, means threaded into one end of said sleeve at an angle to the axis of said sleeve for moving said keys in one direction so that said keys are wedged into locking engagement with said coupling sleeve and said shaft, and means in the other end of said coupling sleeve adapted to receive a turnable cam pin having an eccentric portion so that when said cam pin is turned said eccentric portion is selectively wedged between said coupling sleeve and said keys so that said wedging action of said keys is removed whereby said coupling sleeve is unlocked from said shaft.

References Cited in the file of this patent

UNITED STATES PATENTS

| | | |
|---|---|---|
| 1,264,230 | Vierus | Apr. 30, 1918 |
| 1,412,235 | Felix | Apr. 11, 1922 |
| 2,207,359 | Shaw | July 9, 1940 |